United States Patent
Karst et al.

(10) Patent No.: US 11,246,255 B2
(45) Date of Patent: Feb. 15, 2022

(54) REAR STEERING CYLINDER DAMPENING

(71) Applicant: DEERE & COMPANY, Moline, IL (US)

(72) Inventors: Austin J. Karst, Ottumwa, IA (US); Thomas D. Morrison, Bettendorf, IA (US); David V. Rotole, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 31 days.

(21) Appl. No.: 16/860,501

(22) Filed: Apr. 28, 2020

(65) Prior Publication Data

US 2021/0329824 A1  Oct. 28, 2021

(51) Int. Cl.
*F15B 11/20* (2006.01)
*A01B 69/00* (2006.01)
*B62D 5/06* (2006.01)
*B62D 5/12* (2006.01)
*B60B 33/00* (2006.01)

(52) U.S. Cl.
CPC ............ *A01B 69/007* (2013.01); *B60B 33/00* (2013.01); *B62D 5/063* (2013.01); *B62D 5/12* (2013.01); *F15B 11/20* (2013.01); *F15B 2211/50563* (2013.01); *F15B 2211/7053* (2013.01); *F15B 2211/71* (2013.01); *F15B 2211/7656* (2013.01)

(58) Field of Classification Search
CPC ............................ A01B 69/007; B62D 11/005
See application file for complete search history.

(56) References Cited

U.S. PATENT DOCUMENTS

| | | | |
|---|---|---|---|
| 7,077,220 B2 * | 7/2006 | Dunn | B60B 35/003 16/35 D |
| 8,496,256 B2 | 7/2013 | Bebernes et al. | |
| 8,925,672 B2 * | 1/2015 | Bebernes | B62D 5/093 180/403 |
| 9,439,341 B2 * | 9/2016 | Bebernes | A01B 69/007 |
| 9,744,986 B2 * | 8/2017 | Young | B62D 5/093 |

* cited by examiner

*Primary Examiner* — Thomas E Lazo

(57) ABSTRACT

A hydraulic system for controlling at least one steerable caster wheel of an agricultural machine includes a first actuator having a piston and including an inboard fluid port for supplying fluid to a first side of the piston to move the piston in a first direction, and an outboard fluid port for supplying fluid to a second side of the piston to move the piston in a second direction. A first fluid pressure equalizer is fluidically coupled to the first side actuator and operable to equalize fluid pressure over a period of time between the first side and the second side of the piston of the first side actuator.

20 Claims, 5 Drawing Sheets

REAR STEERING CYLINDER DAMPENING

TECHNICAL FIELD

The disclosure generally relates to a hydraulic system for controlling a pair of steerable rear caster wheels of an agricultural machine.

BACKGROUND

Some agricultural machines, such as but not limited to self-propelled windrowers, are driven through a dual-path hydrostatic system. Speed changes are made by adjusting the speed of both front drive wheels simultaneously. Primary steering or direction changes are made by adjusting the relative speed of the front drive wheels. The rear wheels of such machines may be caster wheels to allow the machine to pivot during direction changes.

Caster wheels are typically carried by a frame of the vehicle, and are free to rotate about a generally vertical axis three hundred sixty degrees (360°). The caster wheel assembly typically includes a shaft defining an axis of rotation, a fork rigidly attached to the bottom end of the shaft, and a caster wheel coupled with the distal ends of the fork.

In order to improve steerability of such vehicles, the vehicle may be equipped a steering system for controlling the rear caster wheels. For example, the vehicle may be equipped with a hydraulic system that actuates hydraulic cylinders to control the position of the rear caster wheels relative to their respective vertical axis about which they rotate. In order to maintain the versatility of the rear steering system of such vehicles, the rear caster wheels should be capable of rotating independently of each other in certain circumstances, such as for example, when reversing directions and/or in response to a significant lateral force.

SUMMARY

A hydraulic system for controlling at least one steerable caster wheel of an agricultural machine is provided. The hydraulic system includes a tank operable to store a supply of a hydraulic fluid. A first side actuator controls a first rear caster wheel. The first side actuator includes a piston moveable in a first direction and an opposing second direction. The first side actuator further includes an inboard fluid port for supplying fluid to a first side of the piston to move the piston in the first direction, and an outboard fluid port for supplying fluid to a second side of the piston to move the piston in the second direction. The hydraulic system further includes a first steering command valve and a rear steering control valve. A first side steering fluid circuit interconnects the first steering command valve and the inboard fluid port of the first side actuator in fluid communication. A first side line is disposed in fluid communication with the outboard fluid port of the first side actuator. A fluidic tie rod fluid circuit connects fluid communication between the left side line and the rear steering control valve. A tank return fluid circuit interconnects the rear steering control valve, the first steering command valve, and the tank in fluid communication. A first fluid pressure equalizer is fluidically coupled to the first side actuator. The first fluid pressure equalizer is operable to equalize fluid pressure over a period of time between the first side and the second side of the piston of the first side actuator.

In one aspect of the disclosure, the hydraulic system may include a second side actuator for controlling a second rear caster wheel. The second side actuator includes a piston moveable in a first direction and an opposing second direction. The second side actuator includes an inboard fluid port for supplying fluid to a first side of the piston to move the piston in the first direction, and an outboard fluid port for supplying fluid to a second side of the piston to move the piston in the second direction.

In another aspect of the disclosure, the hydraulic system may further include a second steering command valve. A second side steering fluid circuit interconnects the second steering command valve and the inboard fluid port of the second side actuator in fluid communication. A second side line is disposed in fluid communication with the outboard fluid port of the second side actuator. The fluidic tie rod fluid circuit connects fluid communication between the second side line and the rear steering control valve. The tank return fluid circuit connects the second steering command valve in fluid communication to the rear steering control valve, the first steering command valve, and the tank.

In one aspect of the disclosure, the hydraulic system includes a second fluid pressure equalizer fluidically coupled to the second side actuator. The second fluid pressure equalizer is operable to equalize fluid pressure over a period of time between the first side and the second side of the piston of the second side actuator.

In one aspect of the disclosure, the first side steering fluid circuit is split to include an inboard port section in fluid communication with the inboard fluid port of the first side actuator, and an outboard port section in fluid communication with the outboard fluid port of the first side actuator. In one implementation, the first fluid pressure equalizer may include a first side restrictive orifice disposed in the outboard port section of the first side steering fluid circuit. Similarly, the second side steering fluid circuit is split to include an inboard port section in fluid communication with the inboard fluid port of the second side actuator, and an outboard port section in fluid communication with the outboard fluid port of the second side actuator. In one implementation, the second fluid pressure equalizer may include a second side restrictive orifice disposed in the outboard port section of the second side steering fluid circuit.

In one aspect of the disclosure, the first fluid pressure equalizer may include a fluid passage defined by the first side actuator and interconnecting the first side and the second side of the piston of the first side actuator. In one implementation, the fluid passage of the first side actuator includes an opening extending through the piston of the first side actuator. In another implementation, the fluid passage of the first side actuator may include a gap extending at least partially around a periphery of the piston of the first side actuator. The gap extends between the first side and the second side of the piston of the first side actuator. The gap may include a notch or cut in the exterior circumference of the piston of the first side actuator.

Similarly, in one aspect of the disclosure, the second fluid pressure equalizer may include a fluid passage defined by the second side actuator and interconnecting the first side and the second side of the piston of the second side actuator. In one implementation, the fluid passage of the second side actuator may include an opening extending through the piston of the second side actuator. In another implementation, the fluid passage of the second side actuator may include a gap extending at least partially around a periphery of the piston of the second side actuator. The gap extends between the first side and the second side of the piston of the second side actuator. The gap may include a notch or cut in the exterior circumference of the piston of the second side actuator.

In one aspect of the disclosure the outboard port section of the first side steering fluid circuit and the outboard port section of the second side steering fluid circuit are connected together and to the fluidic tie rod fluid circuit in fluid communication. The first side line is connected in fluid communication to the outboard port section of the first side steering fluid circuit. Similarly, the second side line is connected in fluid communication to the outboard port section of the second side steering fluid circuit.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
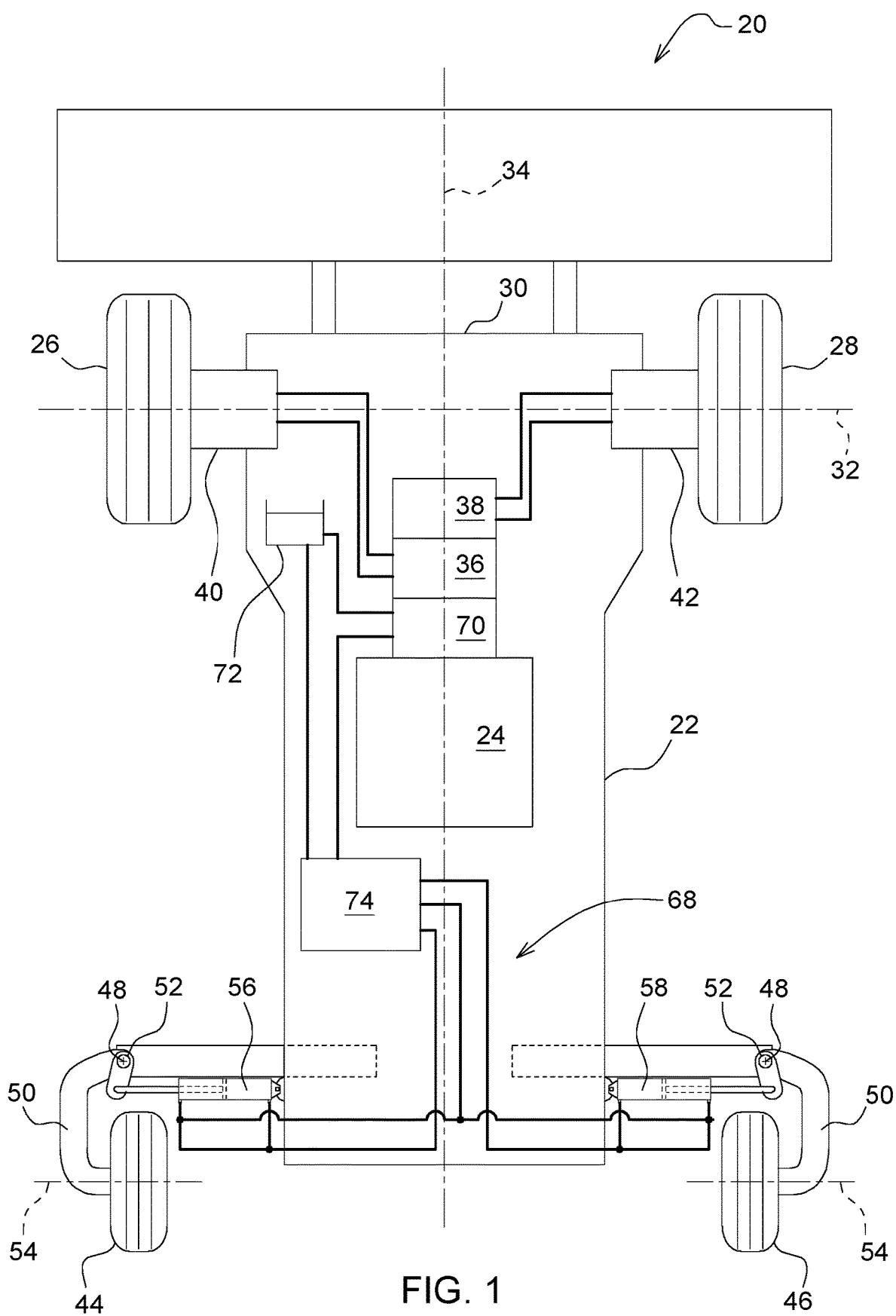
FIG. 1 is a schematic plan view of an agricultural machine.

Referring to the Figures, wherein like numerals indicate like parts throughout the several views, an agricultural machine is generally shown at 20 in FIG. 1. The example embodiment of the agricultural machine 20 shown in FIG. 1 includes, but is not limited to, a self-propelled windrower. However, it should be appreciated that the teachings of this disclosure may be applied to machines other than the example windrower depicted in FIG. 1.

Referring to FIG. 1, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22.

A first drive pump 36 and a second drive pump 38 are coupled to and driven by the prime mover 24. The first drive pump 36 supplies pressurized fluid to a first hydraulic motor 40. The first hydraulic motor 40 is coupled to the left front drive wheel 26 and operable to rotate the left front drive wheel 26 to propel the agricultural machine 20. The second drive pump 38 supplies pressurized fluid to a second hydraulic motor 42. The second hydraulic motor 42 is coupled to the right front drive wheel 28 and operable to rotate the right front drive wheel 28 to propel the agricultural machine 20.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Figure 2:
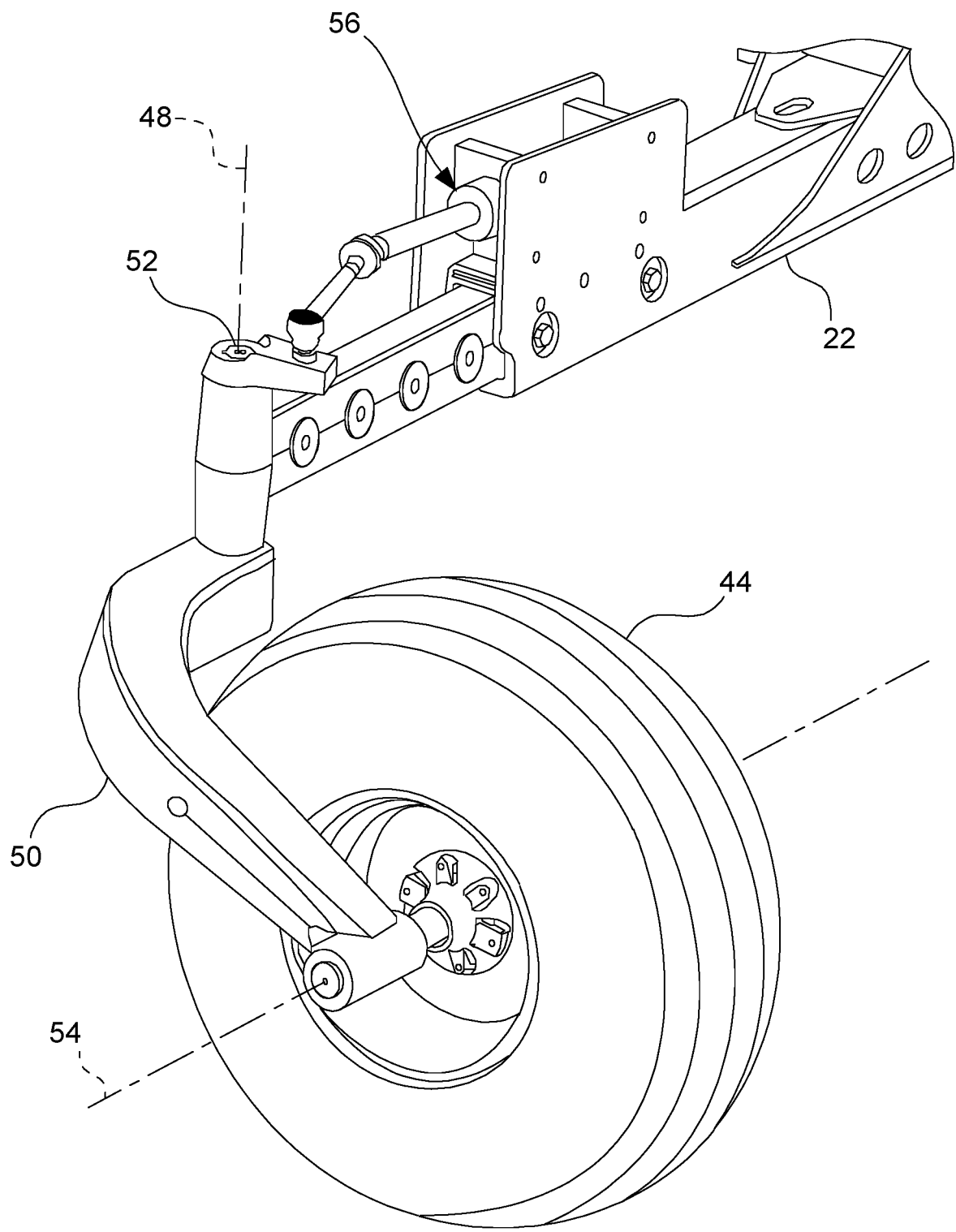
FIG. 2 is a schematic perspective view of a rear caster wheel of the agricultural machine.

Referring to FIGS. 1 and 2, the agricultural machine 20 further includes a left rear caster wheel 44 and a right rear caster wheel 46 attached to the frame 22. As used herein, the term "caster wheel" should be understood to include a wheel that is able to rotate a full three hundred sixty degrees (360°) about a respective generally vertical axis 48. As such, each of the left rear caster wheel 44 and the right rear caster wheel 46 are rotatable a full three hundred sixty degrees (360°) about a respective generally vertical axis 48. The left rear caster wheel 44 and the right rear caster wheel 46 may be attached to the frame 22 in a suitable manner. For example, as shown in FIG. 2, the caster wheels may be attached to the frame 22 via an arm 50. The arm 50 includes an upper shaft 52 that is rotatable about the generally vertical axis 48. The caster wheel is attached to lower distal end of the arm 50. Typically, a generally horizontal axis 54 of rotation of the wheel is longitudinally offset from the generally vertical axis 48, such that the caster wheel tends to follow behind the generally vertical axis 48. It should be appreciated that the right rear caster wheel 46 and the left rear caster wheel 44 may be attached to the frame 22 in some other manner than described herein.

Figure 4:
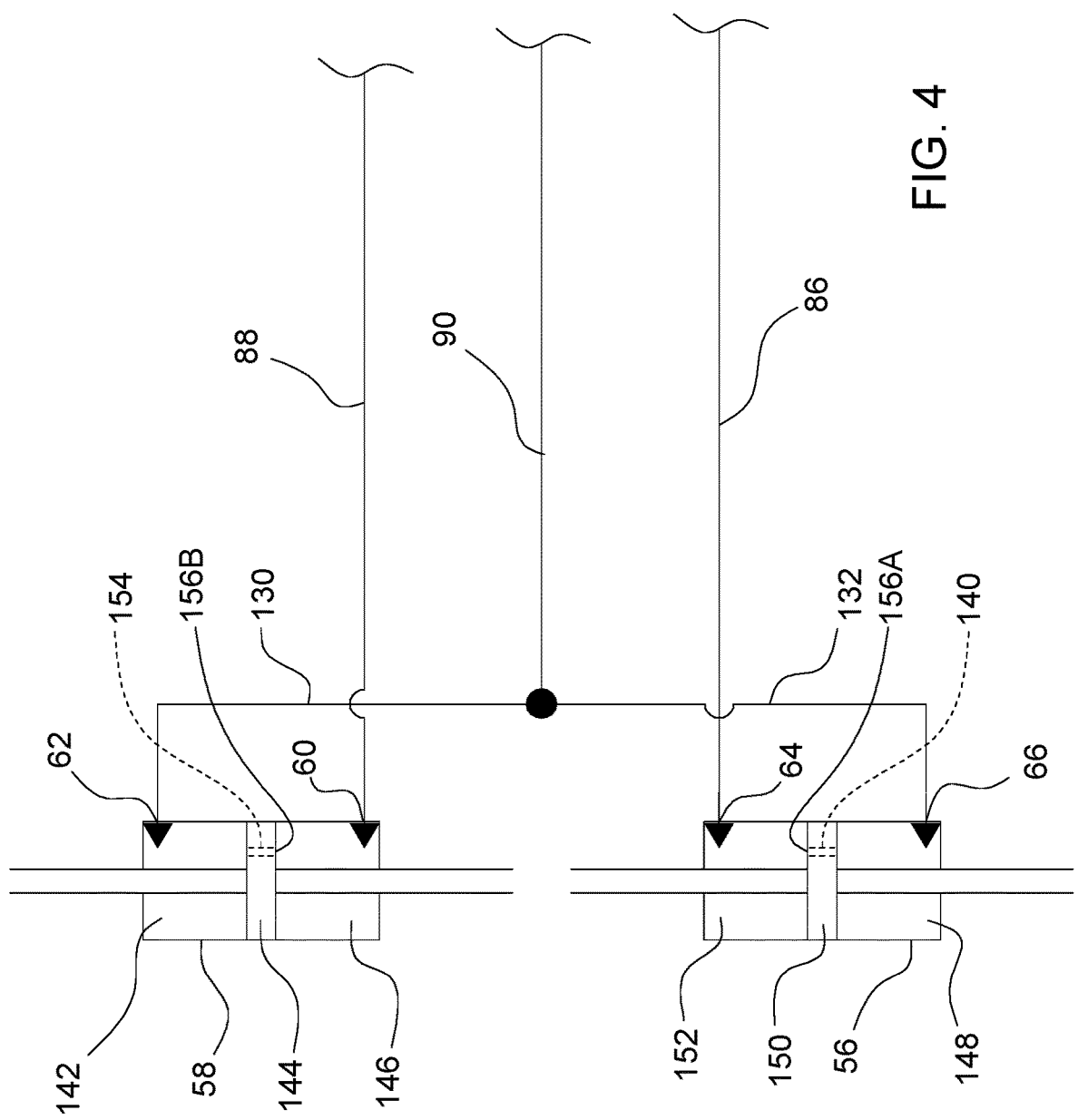
FIG. 4 is a schematic layout of an alternative embodiment of the hydraulic system.

A left side actuator 56 interconnects the left rear caster wheel 44 and the frame 22, and is configured to control a position of the left rear caster wheel 44. Similarly, a right side actuator 58 interconnects the right rear caster wheel 46 and the frame 22, and is configured to control a position of the right rear caster wheel 46. In the example embodiment shown in FIG. 1 and described herein, each of the right side actuator 58 and the left side actuator 56 include a double acting hydraulic cylinder. As such, the right side actuator 58 includes an inboard port 60 and an outboard port 62 for receiving and/or discharging hydraulic fluid. Referring to FIG. 4, the outboard port 62 of the right side actuator 58 communicates fluid to and from a first side 142 of a piston 144 of the right side actuator 58. The inboard port 60 of the right side actuator 58 communicates fluid to and from a second side 146 of the piston 144 of the right side actuator 58. Similarly, the left side actuator 56 includes an inboard port 64 and an outboard port 66 for receiving and/or discharging hydraulic fluid. The outboard port 66 of the left side actuator 56 communicates fluid to and from a first side 148 of a piston 150 of the left side actuator 56. The inboard port 64 of the left side actuator 56 communicates fluid to and from a second side 152 of the piston 150 of the left side actuator 56.

The agricultural machine 20 includes a hydraulic system 68 for controlling the pair of steerable caster wheels, i.e., the left rear caster wheel 44 and the right rear caster wheel 46. While the left front drive wheel 26 and the right front drive wheel 28 provide the primary steering for the agricultural machine 20, the left rear caster wheel 44 and the right rear caster wheel 46 may be controlled to provide a steering assist and/or improve steering responsiveness under certain operating conditions. The hydraulic system connects the left side actuator 56 and the right side actuator 58 to provide a fluid tie rod therebetween. In other words, under certain operating conditions, the operation of the left rear caster wheel 44 and the right rear caster wheel 46 may be coupled together to provide a steering force to the agricultural machine 20, while in other operating conditions, the operation of the left rear caster wheel 44 and the right rear caster wheel 46 may be coupled to provide independent operation. Additionally, the hydraulic system 68 allows hydraulic forces applied to the left side actuator 56 and the right side actuator 58 to be overcome or overridden by forces applied to the left rear caster wheel 44 and the right rear caster wheel 46 by the ground.

The hydraulic system 68 includes a pressure source 70 configured to supply a flow of pressurized fluid. The pressure source 70 may include, but is not limited to, an auxiliary fluid pump that is drivenly coupled to the prime mover 24. The pressure source 70 draws fluid from a tank 72, and circulates the fluid through the hydraulic system 68. The tank 72 receives the fluid from the hydraulic system 68, stores the fluid, and supplies the fluid to the pressure source 70, e.g., the auxiliary fluid pump shown in FIG. 1.

Figure 3:
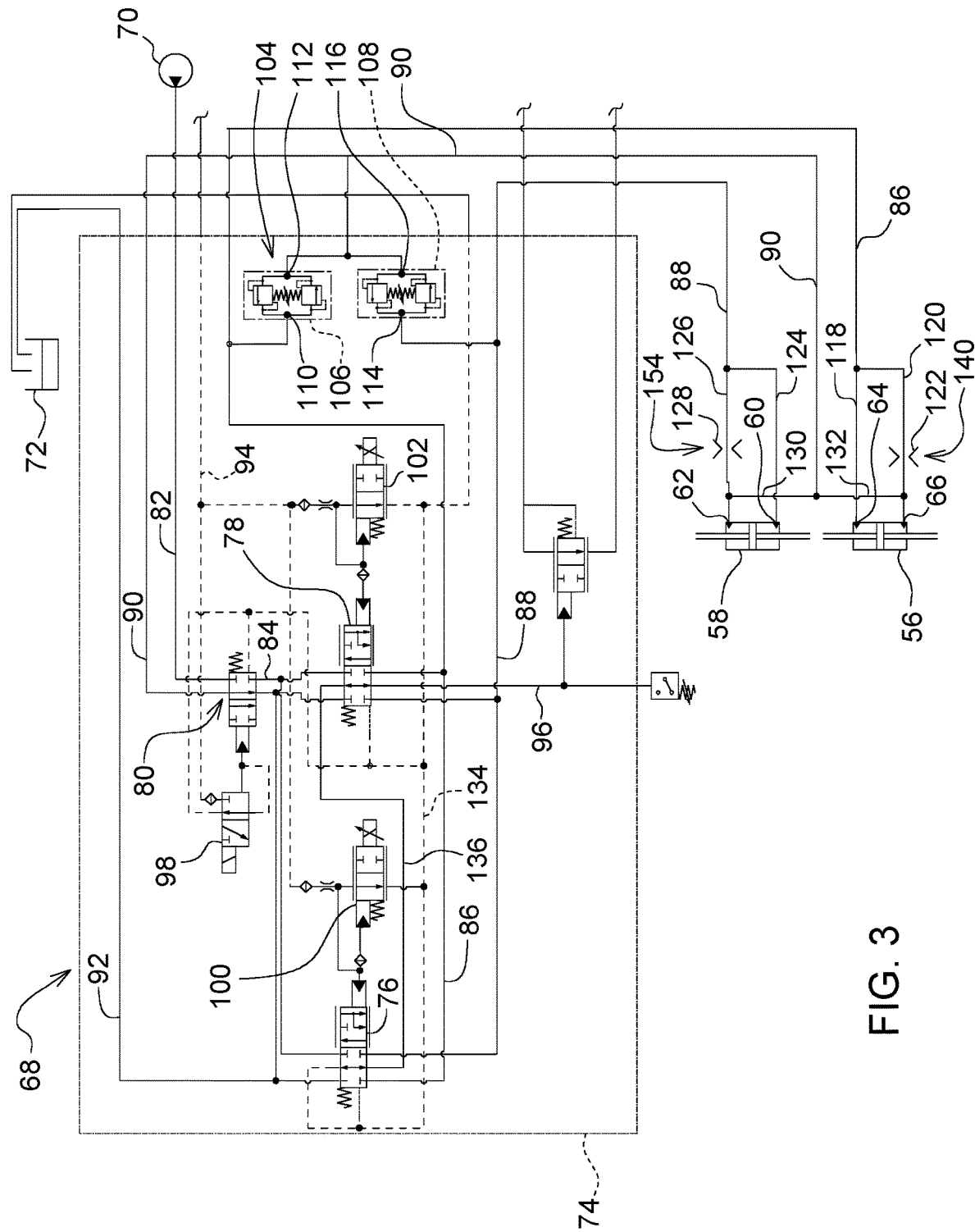
FIG. 3 is a schematic layout of a hydraulic system of the agricultural machine.

Referring to FIG. 3, the hydraulic system 68 is shown schematically using standard American National Standards Institute (ANSI) hydraulic symbols to represent the various components of the example hydraulic system 68 therein. The hydraulic system 68 includes the pressure source 70 and the tank 72 described above, in combination with a valve block 74 and a plurality of fluid circuits described in greater detail below. It should be appreciated that the various fluid circuits described herein are defined fluid pathways or passages defined by the valve block 74, hard lines, flexible lines, fittings, connections, etc., that connect the various components and direct the fluid between components.

The valve block 74 includes a left steering command valve 76, a right steering command valve 78, and a rear steering control valve 80. A supply pressure fluid circuit 82 interconnects the pressure source 70 and the rear steering control valve 80 in fluid communication. A command valve supply fluid circuit 84 interconnects the rear steering control valve 80 with both the right steering command valve 78 and the left steering command valve 76 in fluid communication. A left side steering fluid circuit 86 interconnects the left side actuator 56 and the left steering command valve 76 in fluid communication. A right side steering fluid circuit 88 interconnects the right side actuator 58 and the right steering command valve 78 in fluid communication. A cross-valve fluid circuit 136 connects the left steering command valve 76 and the right steering command valve 78 in fluid communication. A fluidic tie rod fluid circuit 90 interconnects both the left side actuator 56 and the right side actuator 58 with the rear steering control valve 80 in fluid communication. A tank return fluid circuit 92 interconnects the rear steering control valve 80, the left steering command valve 76, the right steering command valve 78, and the tank 72 in fluid communication. A pilot supply fluid circuit 94 is disposed in fluid communication with the left steering command valve 76, the right steering command valve 78, and the rear steering control valve 80. A pilot return fluid circuit 134 is disposed in fluid communication with the left steering command valve 76, the right steering command valve 78, the rear steering control valve 80, and the tank 72. A pressure sensor fluid circuit 96 is disposed in fluid communication with the right steering command valve 78, and communicates fluid to a pressure sensor.

The rear steering control valve 80 is controllable between a first state and a second state. When the rear steering control valve 80 is disposed in the first state, the fluidic tie rod fluid circuit 90 and the tank return fluid circuit 92 are connected in fluid communication and the supply pressure fluid circuit 82 and the command valve supply fluid circuit 84 are disconnected from fluid communication. When the rear steering control valve 80 is disposed in the second state the fluidic tie rod fluid circuit 90 and the tank return fluid circuit 92 are disconnected from fluid communication and the supply pressure fluid circuit 82 and the command valve supply fluid circuit 84 are connected in fluid communication. The rear steering control valve 80 is normally disposed in the first state and is controlled into the second state in response to an activation signal. The activation signal causes the rear steering control valve 80 to move from the first state to the second state. In the absence of the activation signal, the rear steering control valve 80 returns to and/or maintains its position in the first state.

The activation signal for the rear steering control valve 80 may include an input that is capable of moving the rear steering control valve 80 from the first state into the second state. For example, the activation signal for the rear steering control valve 80 may include, but is not limited to, a fluid signal, a pneumatic signal, an electronic signal, a mechanical signal, etc. In the example embodiment shown in FIG. 3, the rear steering control valve 80 is a pilot actuated position control valve, in which a dedicated pilot valve 98 is disposed in fluid communication with the pilot supply fluid circuit 94 and is operable in response to an electronic signal to provide a hydraulic activation signal to the rear steering control valve 80 to move the rear steering control valve 80 from its first position to its second position. It should be appreciated that the rear steering control valve 80 and the manner of actuating the rear steering control valve 80 may differ from the example embodiment depicted in FIG. 3 and described herein.

As shown in the example embodiment of FIG. 3, the left steering command valve 76 may include a pilot actuated variable directional control valve. The left steering command valve 76 is moveable between a first state, a second state, and a plurality of positions between the first state and the second state. When the left steering command valve 76 is disposed in the first state, the left steering command valve 76 is configured to disconnect fluid communication between the left side steering fluid circuit 86 and the tank return fluid circuit 92, connect fluid communication between the pilot return fluid circuit 134 and the cross-valve fluid circuit 136, and disconnect fluid communication between the command valve supply fluid circuit 84 and the right side steering fluid circuit 88. When the left steering command valve 76 is disposed in the second state, the left steering command valve 76 is configured to connect fluid communication between the left side steering fluid circuit 86 and the tank return fluid circuit 92, close fluid communication to the pilot return fluid circuit 134, and connect fluid communication between the command valve supply fluid circuit 84 with both the right side steering fluid circuit 88 and the cross-valve fluid circuit 136. The left steering command valve 76 is normally disposed in the first state and is controlled into the second state or a position between the first state and the second state in response to a variable activation signal. The variable activation signal causes the left steering command valve 76 to move from the first state into the second state or to a desired position between the first state and the second state. In the absence of the activation signal, the left steering command valve 76 returns to and/or maintains its position in the first state.

The variable activation signal for the left steering command valve 76 may include an input that is capable of moving the left steering command valve 76 from the first state into the second state or to a position between the first state and the second state. For example, the variable activation signal for the left steering command valve 76 may include, but is not limited to, a variable fluid signal, a variable pneumatic signal, a variable electronic signal, a variable mechanical signal, etc. In the example embodiment shown in FIG. 3, the left steering command valve 76 is a variable pilot actuated variable position control valve, in which a dedicated variable pilot valve 100 is disposed in fluid communication with the pilot supply fluid circuit 94 and is operable in response to an electronic signal to provide a variable hydraulic activation signal to the left steering command valve 76 to move the left steering command valve 76 from its first position to its second position or a position between its first position and its second position. It should be appreciated that the left steering command valve 76 and the manner of actuating the left steering command valve 76 may differ from the example embodiment depicted in FIG. 3 and described herein.

As shown in the example embodiment of FIG. 3, the right steering command valve 78 may include a pilot actuated variable directional control valve. The right steering command valve 78 is moveable between a first state, a second state, and a plurality of positions between the first state and the second state. When the right steering command valve 78 is disposed in the first state, the right steering command valve 78 is configured to disconnect fluid communication between the right side steering fluid circuit 88 and the tank return fluid circuit 92, connect fluid communication between the cross-valve fluid circuit 136 and the pressure sensor fluid circuit 96, and disconnect fluid communication between the command valve supply fluid circuit 84 and the left side steering fluid circuit 86. When the right steering command valve 78 is disposed in the second state, the right steering command valve 78 is configured to connect fluid communication between the right side steering fluid circuit 88 and the tank return fluid circuit 92, disconnect fluid communication to the cross-valve fluid circuit 136, and connect fluid communication between the command valve supply fluid circuit 84 and both the left side steering fluid circuit 86 and the pressure sensor fluid circuit 96. The right steering command valve 78 is normally disposed in the first state and is controlled into the second state or a position between the first state and the second state in response to a variable activation signal. The variable activation signal causes the right steering command valve 78 to move from the first state into the second state or to a desired position between the first state and the second state. In the absence of the activation signal, the right steering command valve 78 returns to and/or maintains its position in the first state.

The variable activation signal for the right steering command valve 78 may include an input that is capable of moving the right steering command valve 78 from the first state into the second state or to a position between the first state and the second state. For example, the variable activation signal for the right steering command valve 78 may include, but is not limited to, a variable fluid signal, a variable pneumatic signal, a variable electronic signal, a variable mechanical signal, etc. In the example embodiment shown in FIG. 3, the right steering command valve 78 is a variable pilot actuated variable position control valve, in which a dedicated variable pilot valve 102 is disposed in fluid communication with the pilot supply fluid circuit 94 and is operable in response to an electronic signal to provide a variable hydraulic activation signal to the right steering command valve 78 to move the right steering command valve 78 from its first position to its second position or a position between its first position and its second position. It should be appreciated that the right steering command valve 78 and the manner of actuating the right steering command valve 78 may differ from the example embodiment depicted in FIG. 3 and described herein.

The hydraulic system 68 further includes a cross port pressure relief system 104 that interconnects the left side steering fluid circuit 86, the right side steering fluid circuit 88, and the fluidic tie rod fluid circuit 90 in fluid communication. As shown in the example embodiment of FIG. 3, the cross port pressure relief system 104 includes a left side pressure relief valve 106 and a right side pressure relief valve 108. The left side pressure relief valve 106 includes a first port 110 connected in fluid communication to the left side steering fluid circuit 86, and a second port 112 connected in fluid communication to the fluidic tie rod fluid circuit 90. The right side pressure relief valve 108 includes a first port 114 connected in fluid communication to the right side steering fluid circuit 88, and a second port 116 connected in fluid communication to the fluidic tie rod fluid circuit 90. The second port 112 of the left side pressure relief valve 106 and the second port 116 of the right side pressure relief valve 108 are both connected in fluid communication to each other, and to the fluidic tie rod fluid circuit 90. In the example shown in FIG. 3, the left side pressure relief valve 106 and the right side pressure relief valve 108 are disposed in the valve block 74. However, in other embodiments, the left side pressure relief valve 106 and the right side pressure relief valve 108 may be disposed in another or different valve body.

The left side pressure relief valve 106 and the right side pressure relief valve 108 provide two-way pressure relief. In other words, regardless of which direction the fluid pressure is applied from, i.e., from first port 110, 114 to second port 112, 116 respectively or from second port 112, 116 to first port 110, 114 respectively, the left side pressure relief valve 106 and the right side pressure relief valve 108 are configured to allow fluid communication when the applied fluid pressure is greater than a defined limit.

In the example implementation shown in FIG. 3, the left side steering fluid circuit 86 is split to include an inboard port section 118 and an outboard port section 120. The inboard port section 118 of the left side steering fluid circuit 86 is disposed in fluid communication with the inboard port 64 of the left side actuator 56. A left side line 132 is connected to the outboard fluid port 66 of the left side actuator 56. The outboard port section 120 of the left side steering fluid circuit 86 is disposed in fluid communication with the left side line 132 and the outboard port 66 of the left side actuator 56.

The right side steering fluid circuit 88 is split to include an inboard port section 124 and an outboard port section 126. The inboard port section 124 of the right side steering fluid circuit 88 is disposed in fluid communication with the inboard port 60 of the right side actuator 58. A right side line 130 is connected to the outboard fluid port 62 of the right side actuator 58. The outboard port section 126 of the right side steering fluid circuit 88 is disposed in fluid communication with the right side line 130 and the outboard port 62 of the right side actuator 58.

The outboard port section 120 of the left side steering fluid circuit 86 and the outboard port section 126 of the right side steering fluid circuit 88 are connected together and to the fluidic tie rod fluid circuit 90 in fluid communication by the left side line 132 and the right side line 130 respectively. The right side line 130 connects the outboard port section 126 of the right side steering fluid circuit 88 and the fluidic tie rod fluid circuit 90 in fluid communication, whereas the left side line 132 connects the outboard port section 120 of the left side steering fluid circuit 86 and the fluidic tie rod fluid circuit 90 in fluid communication.

The hydraulic system 68 further includes a first fluid pressure equalizer 140. The first fluid pressure equalizer 140 is fluidically coupled to the left side actuator 56, and is operable to equalize fluid pressure over a period of time between the first side 148 and the second side 152 of the piston 150 of the left side actuator 56. By allowing the fluid pressure to equalize between the first side 148 and the second side 152 of the piston 150 of the left side actuator 56, the left rear caster wheel 44, which is attached to and controlled by the left side actuator 56, may re-phase and come back into alignment with the direction of travel of the agricultural machine 20, even when the position of the left side actuator 56 is being actively controlled by the left steering command valve 76.

The first fluid pressure equalizer 140 may include any component or system of components that allow fluid to bleed across or between the first side 148 and the second side 152 of the piston 150 of the left side actuator 56. For example, referring to FIG. 3, the first fluid pressure equalizer 140 may include a left side restrictive orifice 122 disposed in the outboard port section 120 of the left side steering fluid circuit 86. The left side line 132 is connected to the outboard port section 120 of the left side steering fluid circuit 86, between the outboard port 66 of the left side actuator 56 and the left side restrictive orifice 122. The left side restrictive orifice 122 may alternatively be referred to as a restrictive opening, a flow restrictor, a fluid restrictor, a fluid restriction, etc. The left side restrictive orifice is operable to restrict, limit, or reduce the flow of the hydraulic fluid therethrough relative to an unrestricted section of the outboard port section 120 of the left side steering fluid circuit 86. As shown in the example embodiment of FIG. 3, the left side restrictive orifice 122 is a type that is not affected by viscosity. The left side restrictive orifice 122 allows fluid to slowly bleed through to equalize pressure on both sides of the left side actuator 56. Because the left side restrictive orifice 122 restricts fluid flow, fluid in the left side steering fluid circuit 86 flows through to the inboard fluid port 64 of the left side actuator 56. Fluid may discharge from the outboard fluid port 66 of the left side actuator 56, and flow through the left side restrictive orifice 122 to rephase the left side actuator 56 relative to the right side actuator 58, so that the left rear caster wheel 44 may re-align with the direction of travel of the agricultural machine 20 relative to the direction of the right rear caster wheel 46.

The hydraulic system 68 may further include a second fluid pressure equalizer 154. The second fluid pressure equalizer 154 is fluidically coupled to the right side actuator 58, and is operable to equalize fluid pressure over a period of time between the first side 142 and the second side 146 of the piston 144 of the right side actuator 58. By allowing the fluid pressure to equalize between the first side 142 and the second side 146 of the piston 144 of the right side actuator 58, the right rear caster wheel 46, which is attached to and controlled by the right side actuator 58, may re-phase and come back into alignment with the direction of travel of the agricultural machine 20, even when the position of the right side actuator 58 is being actively controlled by the right steering command valve 78.

The second fluid pressure equalizer 154 may include any component or system of components that allow fluid to bleed across or between the first side 142 and the second side 146 of the piston 144 of the right side actuator 58. For example, referring to FIG. 3, the second fluid pressure equalizer 154 may include a right side restrictive orifice 128 disposed in the outboard port section 126 of the right side steering fluid circuit 88. The right side line 130 is connected to the outboard port section 126 of the right side steering fluid circuit 88, between the outboard port 62 of the right side actuator 58 and the right side restrictive orifice 128. The right side restrictive orifice 128 may alternatively be referred to as a restrictive opening, a flow restrictor, a fluid restrictor, a fluid restriction, etc. The right side restrictive orifice 128 is operable to restrict, limit, or reduce the flow of the hydraulic fluid therethrough relative to an unrestricted section of the right side steering fluid circuit 88. As shown in the example embodiment of FIG. 3, the right side restrictive orifice 128 is a type that is not affected by viscosity. The right side restrictive orifice 128 allows fluid to slowly bleed through to equalize pressure on both sides of the right side actuator 58. Because the right side restrictive orifice 128 restricts fluid flow, fluid in the right side steering fluid circuit 88 flows through to the inboard fluid port 60 of the right side actuator 58. Fluid may discharge from the outboard fluid port 62 of the right side actuator 58, and flow through the right side restrictive orifice 128 to rephase the right side actuator 58 relative to the left side actuator 56, so that the right rear caster wheel 46 may re-align with the direction of travel of the agricultural machine 20 relative to the direction of the left rear caster wheel 44.

It should be appreciated that the left side restrictive orifice 122 and the right side restrictive orifice 128 allow fluid to bleed across or between the sides of their respective actuators 56, 58 over a period of time. The pressure equalization is not instantaneous. The rate or period of time over which the pressure equalizes between the two sides of the pistons of the respective actuators 56, 58 is dependent upon the size or flow area of the respective restrictive orifice 122, 128. This allows the position of the rear caster wheels 44, 46 to be actively controlled, yet still allow the rear caster wheels to re-phase, re-align, or otherwise pivot relative to each other in response to lateral loading applied to the wheels 44, 46.

Referring to FIG. 4, an alternative embodiment of the first fluid pressure equalizer 140 and the second fluid pressure equalizer 154 are shown. As shown in FIG. 4, the first fluid pressure equalizer 140 includes a fluid passage 156A defined by the left side actuator 56. The fluid passage 156A of the first fluid pressure equalizer 140 interconnects the first side 148 and the second side 152 of the piston 150 of the left side actuator 56. Similarly, the second fluid pressure equalizer 154 includes a fluid passage 156B defined by the right side actuator 58. The fluid passage 156B of the second fluid pressure equalizer 154 interconnects the first side 142 and the second side 146 of the piston 144 of the right side actuator 58.

Figure 5:
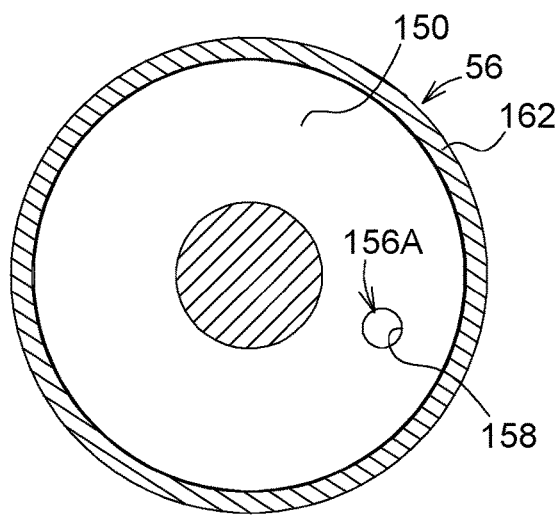
FIG. 5 is a schematic cross sectional view of a first implementation of a hydraulic actuator of the alternative embodiment of the hydraulic system.

Referring to FIG. 5, a cross section of an implementation of the left side actuator 56 is shown. It should be appreciated that the fluid passage 156B of the right side actuator 58 may be configured similarly to the fluid passage 156A of the left side actuator 56 shown in FIG. 5. As shown in FIG. 5, the fluid passage 156A of the left side actuator 56 includes an opening, port, or aperture 158 extending through the piston 150 of the left side actuator 56. The fluid flow rate and/or the amount of fluid that may bleed across the piston 150 over a given amount of time, is dependent upon the cross sectional area of the aperture 158. A larger cross sectional area of the aperture 158 allows a higher flow rate, which allows the left side actuator 56 to re-phase faster then a smaller cross sectional area of the aperture 158.

Figure 6:
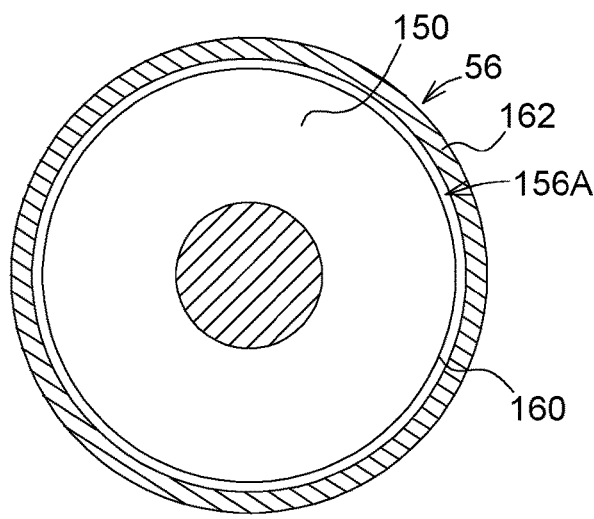
FIG. 6 is a schematic cross sectional view of a second implementation of the hydraulic actuator of the alternative embodiment of the hydraulic system.
Figure 7:
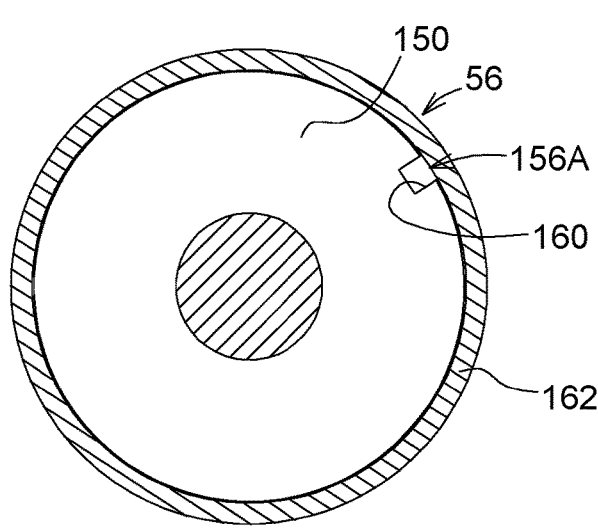
FIG. 7 is a schematic cross sectional view of a third implementation of the hydraulic actuator of the alternative embodiment of the hydraulic system.

Referring to FIG. 6, a cross section of another implementation of left side actuator 56 is shown. While the right side actuator 58 is not shown, it should be appreciated that the fluid passage 158B of the right side actuator 58 may be configured similarly to the fluid passage 156A of the left side actuator 56 shown in FIG. 6. As shown in FIG. 6, the fluid passage 156A of the left side actuator 56 includes a gap 160 extending at least partially around a periphery of the piston 150 of the left side actuator 56. The gap 160 extends between or from the first side 148 and/or to the second side 152 of the piston 150 of the left side actuator 56. As shown in FIG. 6, the piston 150 may be constructed without a seal, such that the gap 160 may extend around the entirety of the circumference of the piston. As such, an exterior circumferential diameter of the piston 150 is less than an interior circumferential diameter of a casing 162 of the left side actuator 56 to define the gap 160 therebetween. In another implementation, the gap 160 may only extend around a portion of the circumference of the piston 150. In yet other another implementation, such as shown in FIG. 7, the gap 160 may be configured as a notch formed in the outer circumferential surface of the piston 150.

Figure 8:
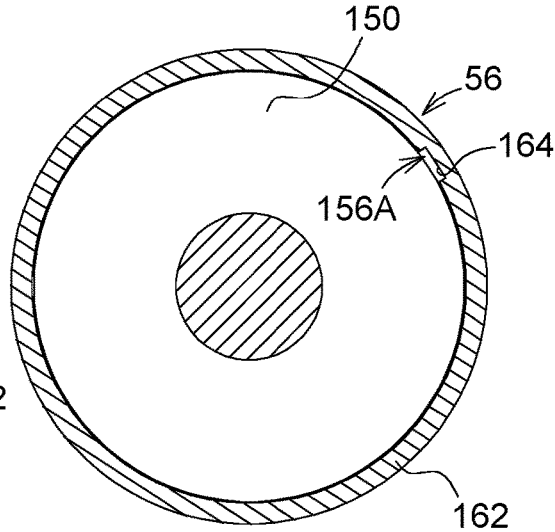
FIG. 8 is a schematic cross sectional view of a fourth implementation of the hydraulic actuator of the alternative embodiment of the hydraulic system.

Referring to FIG. 8, a cross section of an implementation of the left side actuator 56 is shown. It should be appreciated that the fluid passage 156B of the right side actuator 58 may be configured similarly to the fluid passage 156A of the left side actuator 56 shown in FIG. 8. As shown in FIG. 8, the fluid passage 156A of the left side actuator 56 includes a groove 164 formed into the interior wall surface of the casing 162, and extending at least a partial length of the casing 162 of the left side actuator 56. The fluid flow rate and/or the amount of fluid that may bleed across the piston 150 over a given amount of time, is dependent upon the cross sectional area of the aperture groove 164. A larger cross sectional area of the groove 164 allows a higher flow rate, which allows the left side actuator 56 to re-phase faster then a smaller cross sectional area of the groove 164.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hydraulic system for controlling at least one steerable caster wheel of an agricultural machine, the hydraulic system comprising:
a tank operable to store a supply of fluid;
a first side actuator for controlling a first rear caster wheel, the first side actuator having a piston moveable in a first direction and an opposing second direction, and including an inboard fluid port for supplying fluid to a first side of the piston to move the piston in the first direction, and an outboard fluid port for supplying fluid to a second side of the piston to move the piston in the second direction;
a first steering command valve and a rear steering control valve;
a first side steering fluid circuit interconnecting the first steering command valve and the inboard fluid port of the first side actuator in fluid communication;
a first side line in fluid communication with the outboard fluid port of the first side actuator;
a fluidic tie rod fluid circuit connecting fluid communication between the first side line and the rear steering control valve;
a tank return fluid circuit interconnecting the rear steering control valve, the first steering command valve, and the tank in fluid communication; and
a first fluid pressure equalizer fluidically coupled to the first side actuator and operable to equalize fluid pressure over a period of time between the first side and the second side of the piston of the first side actuator.

2. The hydraulic system set forth in claim 1, wherein the first side steering fluid circuit is split to include an inboard port section in fluid communication with the inboard fluid port of the first side actuator and an outboard port section in fluid communication with the outboard fluid port of the first side actuator.

3. The hydraulic system set forth in claim 2, wherein the first fluid pressure equalizer includes a first side restrictive orifice disposed in the outboard port section of the first side steering fluid circuit.

4. The hydraulic system set forth in claim 1, wherein the first fluid pressure equalizer includes a fluid passage defined by the first side actuator and interconnecting the first side and the second side of the piston of the first side actuator.

5. The hydraulic system set forth in claim 4, wherein the fluid passage of the first side actuator includes an opening extending through the piston of the first side actuator.

6. The hydraulic system set forth in claim 4, wherein the fluid passage of the first side actuator includes a gap extending at least partially around a periphery of the piston of the first side actuator, wherein the gap extends between the first side and the second side of the piston of the first side actuator.

7. The hydraulic system set forth in claim 1, further comprising:
a second side actuator for controlling a second rear caster wheel, the second side actuator having a piston moveable in a first direction and an opposing second direction, and including an inboard fluid port for supplying fluid to a first side of the piston to move the piston in the first direction, and an outboard fluid port for supplying fluid to a second side of the piston to move the piston in the second direction;
a second steering command valve;
a second side steering fluid circuit interconnecting the second steering command valve and the inboard fluid port of the second side actuator in fluid communication;

a second side line in fluid communication with the outboard fluid port of the second side actuator;

wherein the fluidic tie rod fluid circuit connects fluid communication between the second side line and the rear steering control valve;

wherein the tank return fluid circuit connects the second steering command valve in fluid communication to the rear steering control valve, the first steering command valve, and the tank; and a second fluid pressure equalizer fluidically coupled to the second side actuator and operable to equalize fluid pressure over a period of time between the first side and the second side of the piston of the second side actuator.

8. The hydraulic system set forth in claim 7, wherein the second fluid pressure equalizer includes a fluid passage defined by the second side actuator and interconnecting the first side and the second side of the piston of the second side actuator.

9. The hydraulic system set forth in claim 8, wherein the fluid passage of the second side actuator includes an opening extending through the piston of the second side actuator.

10. The hydraulic system set forth in claim 8, wherein the fluid passage of the second side actuator includes a gap extending at least partially around a periphery of the piston of the second side actuator, wherein the gap extends between the first side and the second side of the piston of the second side actuator.

11. The hydraulic system set forth in claim 7, wherein the second side steering fluid circuit is split to include an inboard port section in fluid communication with the inboard fluid port of the second side actuator and an outboard port section in fluid communication with the outboard fluid port of the second side actuator.

12. The hydraulic system set forth in claim 11 wherein the second fluid pressure equalizer includes a second side restrictive orifice disposed in the outboard port section of the second side steering fluid circuit.

13. The hydraulic system set forth in claim 11, wherein the outboard port section of the first side steering fluid circuit and the outboard port section of the second side steering fluid circuit are connected together and to the fluidic tie rod fluid circuit in fluid communication.

14. The hydraulic system set forth in claim 11, wherein the first side line is connected in fluid communication to the outboard port section of the first side steering fluid circuit, and wherein the second side line is connected in fluid communication to the outboard port section of the second side steering fluid circuit.

15. The hydraulic system set forth in claim 1, further comprising:

a pressure source configured to supply a flow of pressurized fluid;

a supply pressure fluid circuit interconnecting the pressure source and the rear steering control valve in fluid communication; and a command valve supply fluid circuit interconnecting the rear steering control valve with both the first steering command valve and the second steering command valve in fluid communication.

16. A hydraulic system for controlling a pair of steerable caster wheels of an agricultural machine, the hydraulic system comprising:

a left side actuator for controlling a left rear caster wheel, the left side actuator having a piston moveable in a first direction and an opposing second direction, and including an inboard fluid port for supplying fluid to a first side of the piston to move the piston in the first direction, and an outboard fluid port for supplying fluid to a second side of the piston to move the piston in the second direction;

a right side actuator for controlling a right rear caster wheel, the right side actuator having a piston moveable in a first direction and an opposing second direction, and including an inboard fluid port for supplying fluid to a first side of the piston to move the piston in the first direction, and an outboard fluid port for supplying fluid to a second side of the piston to move the piston in the second direction;

a left steering command valve, a right steering command valve, and a rear steering control valve;

a left side steering fluid circuit interconnecting the left steering command valve and the inboard fluid port of the left side actuator in fluid communication;

a left side line in fluid communication with the outboard fluid port of the left side actuator;

a right side steering fluid circuit interconnecting the right steering command valve and the inboard fluid port of the right side actuator in fluid communication;

a right side line in fluid communication with the outboard fluid port of the right side actuator;

a fluidic tie rod fluid circuit connecting fluid communication between both the left side line and the right side line with the rear steering control valve;

a tank return fluid circuit interconnecting the rear steering control valve, the left steering command valve, the right steering command valve, and the tank in fluid communication;

a first fluid pressure equalizer fluidically coupled to the left side actuator and operable to equalize fluid pressure over a period of time between the first side and the second side of the piston of the left side actuator; and a second fluid pressure equalizer fluidically coupled to the right side actuator and operable to equalize fluid pressure over a period of time between the first side and the second side of the piston of the right side actuator.

17. The hydraulic system set forth in claim 16, wherein:

the left side steering fluid circuit is split to include an inboard port section in fluid communication with the inboard fluid port of the left side actuator and an outboard port section in fluid communication with the outboard fluid port of the left side actuator;

the right side steering fluid circuit is split to include an inboard port section in fluid communication with the inboard fluid port of the right side actuator and an outboard port section in fluid communication with the outboard fluid port of the right side actuator;

the first fluid pressure equalizer includes a first side restrictive orifice disposed in the outboard port section of the left side steering fluid circuit; and the second fluid pressure equalizer includes a second side restrictive orifice disposed in the outboard port section of the right side steering fluid circuit.

18. The hydraulic system set forth in claim 16, wherein:

the first fluid pressure equalizer includes a fluid passage defined by the left side actuator and interconnecting the first side and the second side of the piston of the left side actuator; and the second fluid pressure equalizer includes a fluid passage defined by the right side actuator and interconnecting the first side and the second side of the piston of the right side actuator.

19. The hydraulic system set forth in claim 18, wherein the fluid passage of the left side actuator includes an opening extending through the piston of the left side actuator, and the fluid passage of the right side actuator includes an opening extending through the piston of the right side actuator.

20. The hydraulic system set forth in claim 18, wherein the fluid passage of the left side actuator includes a gap extending at least partially around a periphery of the piston of the left side actuator, with the gap extending between the first side and the second side of the piston of the left side actuator, and wherein the fluid passage of the right side actuator includes a gap extending at least partially around a periphery of the piston of the right side actuator, with the gap extending between the first side and the second side of the piston of the right side actuator.

* * * * *